(No Model.) 3 Sheets—Sheet 1.
G. F. POOLEY.
SHIRT.
No. 594,277. Patented Nov. 23, 1897.
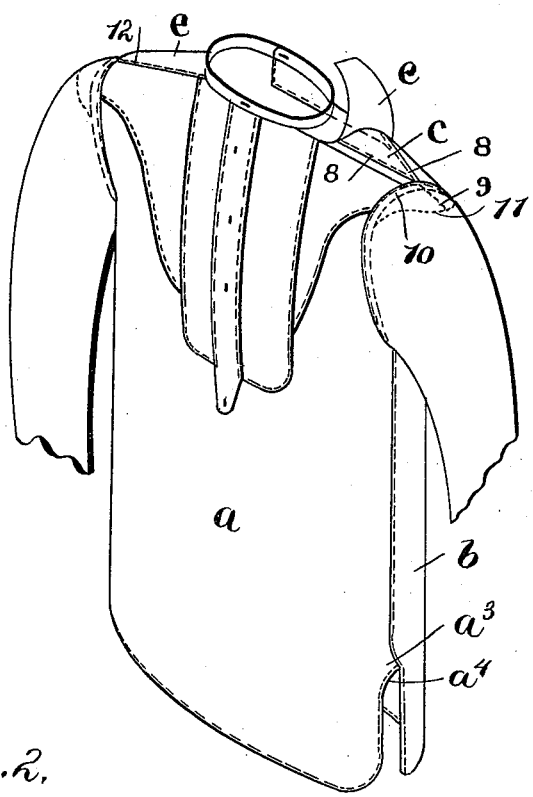
Fig. 1.
Fig. 2.
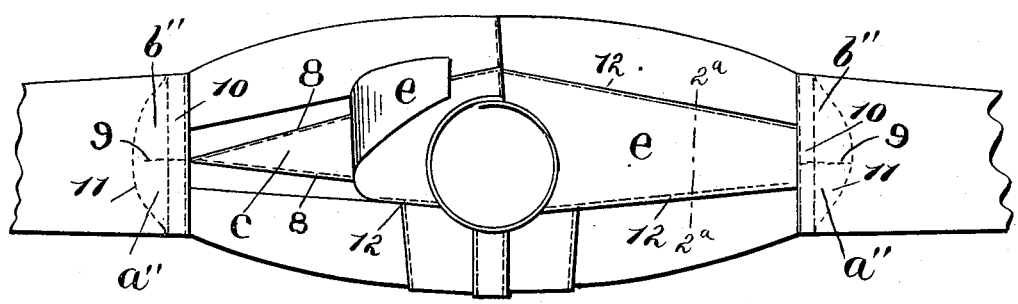
Fig. 2ᵃ
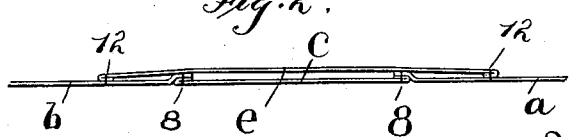
Witnesses
Geo. E. Frech.
Norman B. Wilder.
Inventor
George F. Pooley.
per Hubert E. Peak
Attorney (No Model.)   3 Sheets—Sheet 2.
G. F. POOLEY.
SHIRT.
No. 594,277.   Patented Nov. 23, 1897.
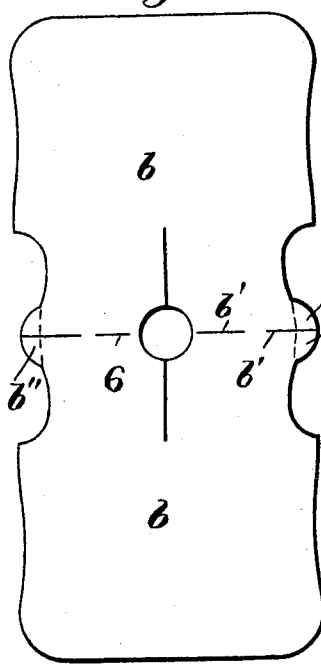
Fig. 3.
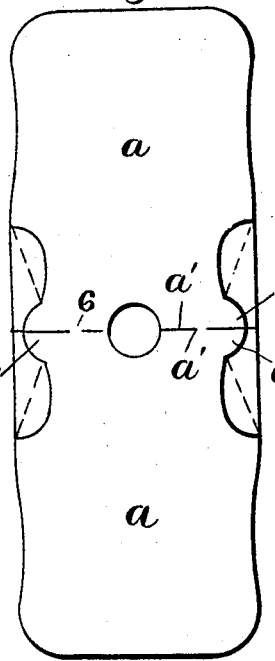
Fig. 4.
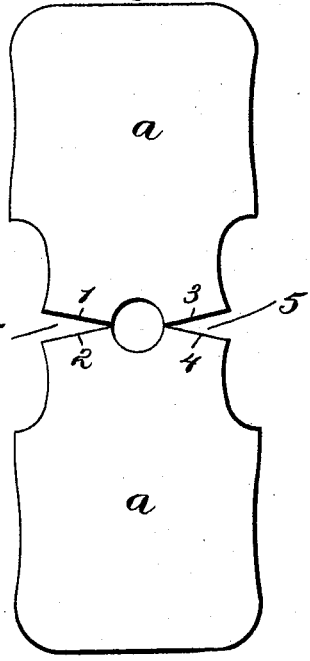
Fig. 7.
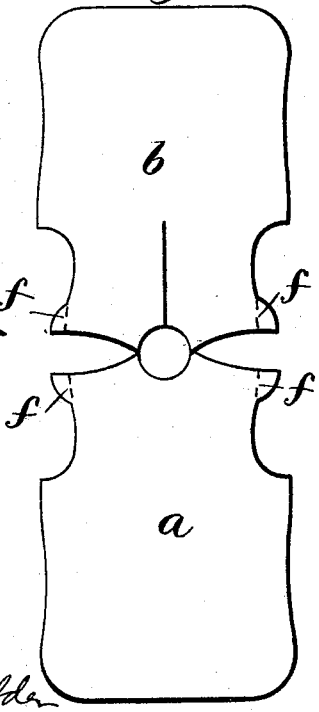
Fig. 8.
Fig. 5.
Fig. 6.
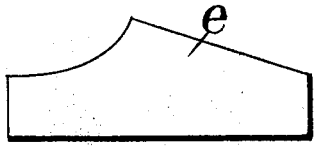
Witnesses
Geo. E. Frech
Nannern B. Wilder
Inventor
George F. Pooley.
per
Hubert E. Peck
Attorney (No Model.) 3 Sheets—Sheet 3.

G. F. POOLEY.
SHIRT.

No. 594,277. Patented Nov. 23, 1897.

Witnesses
Geo. E. Frech.
Norman B. Wilder

Inventor
George F. Pooley.
per Hubert E. Peck
Attorney

UNITED STATES PATENT OFFICE.

GEORGE F. POOLEY, OF BROOKLYN, MARYLAND, ASSIGNOR TO BEULAH S. POOLEY, OF SAME PLACE, AND EDWARD F. POOLEY, OF PHILADELPHIA, PENNSYLVANIA.

SHIRT.

SPECIFICATION forming part of Letters Patent No. 594,277, dated November 23, 1897.

Application filed March 15, 1897. Serial No. 627,690. (No specimens.)

*To all whom it may concern:*

Be it known that I, GEORGE F. POOLEY, a citizen of the United States, residing at Brooklyn, in the county of Anne Arundel and State of Maryland, have invented certain new and useful Improvements in Garments; and I do hereby declare the following to be a full, clear, and exact description of the invention, such as will enable others skilled in the art to which it appertains to make and use the same.

This invention relates to certain improvements in garments.

The invention consists in certain novel features of construction and in combinations and arrangements of parts more fully and particularly set forth and described hereinafter.

Referring to the accompanying drawings, Figure 1 is a view illustrating a portion of a shirt provided with my invention, the upper shoulder-yoke on one side being detached and turned partially back to show the tapered under yoke, dotted lines showing the portions of the front and back overlapping the shoulder portion of the sleeve and the stitching uniting the same to the sleeve. Fig. 2 is a view looking down on the shoulders of the shirt shown conforming to the figure of the wearer, dotted lines showing the under yoke and the portions of the front and back overlapping the sleeves. Fig. 2$^a$ is a cross-sectional view taken in the plane of line 2$^a$ 2$^a$, Fig. 2. Figs. 3 and 4 are plan views or patterns for the back and front blanks for the shirt, shown with their upper edges together to illustrate how a single cut will form the top edges of both a back and a front. Fig. 5 is the pattern for an under shoulder-yoke. Fig. 6 is the pattern for an upper or reinforce shoulder-yoke. Fig. 7 is a diagrammatical view showing the shapes of the ordinary front and back shirt-blanks and the waste of material in cutting the same. Fig. 8 is a diagrammatical view showing the sleeve-reinforce applied to a shirt-body formed of separate front and back where the inside or under yokes are not employed and the meeting edges of the front and back are formed to give the slope to the shoulders of the shirt. Fig. 9 is the pattern for the body of the shirt formed in one piece, showing the body provided with the sleeve reinforce portions. Fig. 10 is a diagrammatical view showing the body of a coat, "jumper," or blouse provided with the lapping sleeve reinforce portions, dotted lines showing the sleeve joined to the body around the armhole and on the projecting portion of the body. Fig. 11 shows the portion of a blank at a split or flap, illustrating a hemmed edge extending along one side of a side projection from the blank, which projection when sewed to the opposite side of the split forms a stay at the split or divided portion. Fig. 12 shows the completed stay or gusset.

Experience in the manufacture of shirts has demonstrated the fact that one of the weakest points of the shirt is where the sleeve is joined to the body or yoke immediately over the shoulder.

It is one of the objects of this invention to reinforce the shirt and sleeves at the shoulder portion without changing the general appearance of the shirt so far as the front and back is concerned and without losing the advantages and trade requirements of the ordinary dress-shirt, and so that the reinforce-pieces sometimes employed at the front and back of the shirt can be employed or not, as desired.

In large factories shirts are made in immense quantities, and every little item of waste in material, labor in making, and time employed is of financial importance. The blanks for the various parts of the shirt are cut out from the sheets of muslin with as little labor and waste of material as possible; but, as shown in Fig. 7, which illustrates the shape of the front and back blanks employed in the ordinary shirt, it will be seen that four cuts (marked 1 2 3 4) are necessary to form the top edges of the blanks from the neck-opening to the armholes and that the triangular pieces marked 5 5 become waste. This is an item of great cost where thousands of dozens of shirts are manufactured.

In the drawings, *a* is the front portion of the body of the shirt, having any suitable bosom inserted therein or placed thereon with the proper neck and armhole openings. In the views showing the blank for the front the same reference-letter refers thereto.

*b* is the back of the shirt, of any suitable or ordinary construction, except at the top or shoulder portions. The same reference-letter also applies to the blank for the back.

To avoid waste of material and to save time and labor in cutting out the blanks for the front and back of the improved shirt, the top edges of the front and back blanks are formed straight from the neck-opening to the armhole portions, as shown by the lines 6 dividing Figs. 3 and 4, so that a single cut will sever the upper edges of the front and back without the least waste at this point, forming the upper edges $a'$ $a'$ of the front and $b'$ and $b'$ of the back of the shirt. The slope of the shoulders of the completed shirt is then allowed for and formed by tapering the under or inner shoulder-yokes $c$ $c$, uniting the upper edges of the front and back from the neck-opening outwardly to points at the armholes, as shown by the pattern Fig. 5. It will be observed that the inner yokes are tapered from the large neck end to the point at the sleeve end and that the neck ends of the yokes are notched as usual to form the rear portion of the neck-opening of the shirt, and the top edges $a'$ $b'$ of the front and back are stitched, as shown, to the corresponding longitudinal edges of the inner yokes by stitching 8, and the edges $a'$ $b'$ meet and are stitched directly together by stitching 9 beyond the outer pointed ends of said yokes, said edges $a'$ $b'$ of the front and back usually meeting at about the lines of stitching 10 around the armholes, uniting the sleeves $d$ to the body of the garment.

In forming the blanks for separate back and front shirts the blanks are formed with projections $a''$ $a''$ $b''$ $b''$ at the upper ends of the armhole-notches, having the straight upper edges in continuation of the edges $a'$ $b'$ of the front and back blanks. When the two blanks are stitched together, the stitching 9 9 unites the straight edges of each pair of projections $a''$ $b''$, so that a single projection from each side of the shirt-body is formed over the shoulder portions and over the armholes and in direct outward continuation of the yokes before described, and overlapping the sleeves for a suitable distance over and partially around the shoulder portion of each sleeve. These portions of the body of the shirt overlapping or extending into the sleeves have their edges stitched around and to the sleeves by the stitching 11 outside of the circular stitching 10 securing the inner edges of the sleeves around the armholes and to the body of the shirt. Hence the sleeves and shoulder portions of the body are reinforced and greatly strengthened at the points of greatest strain of the sleeves on the body and yet without in any way interfering with the construction or formation of other portions of the shirt or body, so that the shirt can be of the ordinary construction at the front and back and whether or not front and back shirt-body reinforce-pieces are employed.

The portions of the body described overlapping the sleeves are usually rounded, as shown, hence enabling the cutter in forming the blanks to cut out certain yokes from the pieces cut out to form the armholes, as shown by dotted lines in Figs. 3 and 4, where a single cut will form the neck-opening notch of the yoke at the same time the curved sleeve reinforce projection of a back or front is cut. In the manufacture of the shirts of ordinary construction the shape and proportionate size of the yokes prevent their cutting from the armhole waste, as can be done in forming the shirt of the present invention.

Another important feature of the present invention is in providing the outer shoulder-yokes $e$ $e$, arranged above the inner or under yokes and extending from the neck-opening to the sleeves, as usual, with shoulder-yokes, but also extending down on the shirt-back beyond the inner yokes and extending down on the front beyond the inner yokes and having their side edges thus extending beyond the inner yokes separately united to the back and front by stitching 12 12, while the square outer ends of these outer reinforcing-yokes usually extend slightly beyond the pointed ends of the inner yokes and are united to the sleeves by the circular stitching 10 around the armholes.

It will thus be seen that the tapered yokes which form the shoulder slant or fit of the shirt are reinforced by the outer yokes, which are preferably, although not necessarily, of the shape and form of the usual shoulder-yokes of the ordinary shirt, wherein the two yokes on each shoulder are of the same size and form and the same stitching unites the edges of each pair to the back, front, and sleeves, while in this shirt of the present invention the outer yokes reinforce the inner yokes and are of a different size from the inner yokes.

The shirt as specifically shown in the drawings is provided with front and back reinforce-pieces, but such pieces form no part of the present invention and their use is not necessary, and also the overlapping portions of the body of the shirt are shown extending into the sleeves; but the invention is not limited to such specific location of the overlapping projections. Also, the reinforcing projections of the shirt-body overlapping the sleeve are shown of greater width than the yokes and extending down at the front and back of the shoulders; but the invention is not strictly limited to such form.

In Fig. 8 the front and back blanks are shown for a shirt or shirt-waist with the reforce projections $f$ to enter and reinforce the sleeves, the dotted lines showing where the circular stitching uniting the sleeves to the body crosses said projections. This view shows the upper edges of the blanks shaped to form the slope of the shoulders of the shirt, so that the tapered inside yoke of the preceding views need not be employed.

These various forms are shown to illustrate fully the importance and general utility and adaptability of that portion of my invention embodying the portion of the body of the garment overlapping the sleeve, which can be employed in any garment having a body and a sleeve.

Figure 9:
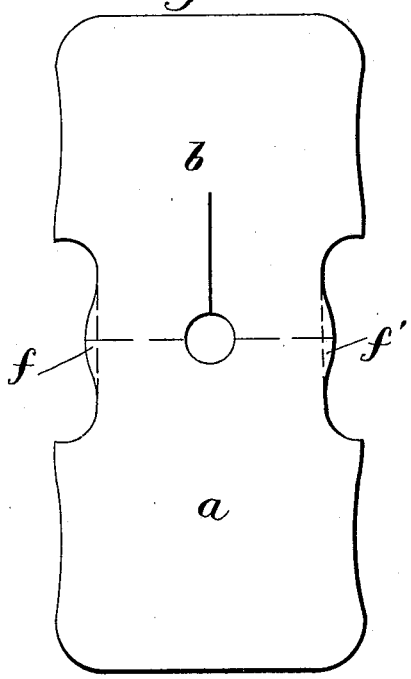
Fig. 9 shows the blank for a cheap shirt not shaped to fit the body at the shoulders and wherein the front and back are formed by a single piece of material, and showing the notches for the armholes provided with the projections $f'$ to overlap and be stitched to the sleeves outside of the stitching uniting the sleeves and body.
Figure 10:
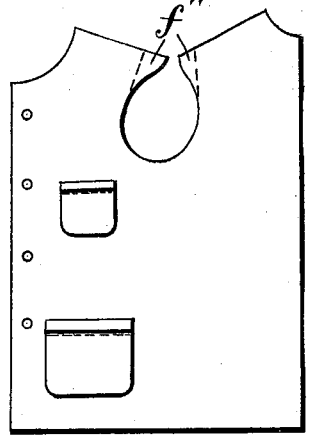
Fig. 10 shows the pattern for one side of a cheap coat, jumper, or blouse formed with the projections $f^2 f^2$ from the body at the top of the armhole to overlap the sleeve. In this pattern the body has two projections on opposite sides of the shoulder-seam, and which are united by said seam to form the single projection in the sleeve.
Figure 11:
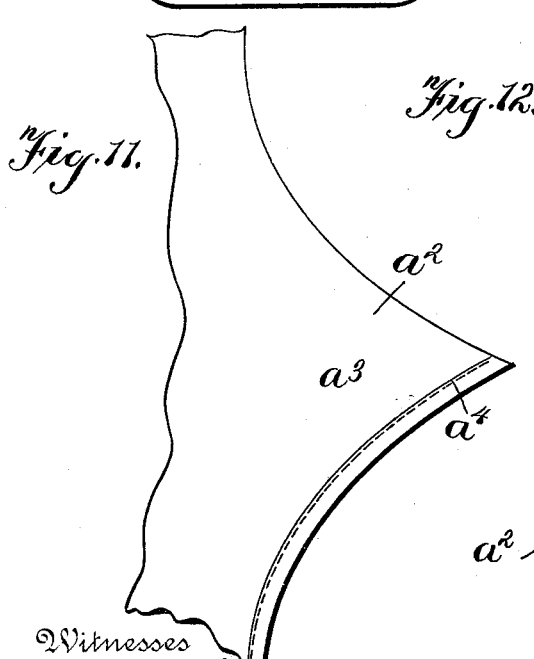
Figure 12:
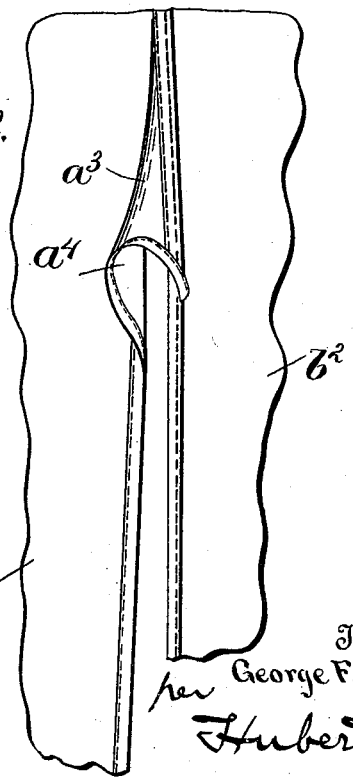

Referring to Figs. 11 and 12, illustrating the improved gusset or stay for garments, $a^2$ indicates one bottom flap of a garment, while $b^2$ indicates the opposite bottom flap. In cutting out the blank for one side of the garment the lateral angular projection $a^3$ is left projecting out from the edge of the garment, so as to be arranged at the top of the split between the flaps when the garment is completed. When the edge of the flap is hemmed before the parts of the garment are united, the hem is continued along one edge of said projection $a^3$, as shown by $a^4$, to the apex or point of the projection, while the opposite edge can be left raw in its original condition. When the pieces of the garment—for instance the front and back of a shirt—are stitched together, the stitching is continued down the two meeting edges above the projection and the projection is held down in continuation of said edges and its raw edge is stitched to the edge of the opposite flap, so that the intermediate portion of the projection is slightly puckered outwardly and the hemmed edge of the projection unites, it might be said, the outer hemmed edges of the two flaps of the shirt, as shown, so that all strain at the junction of the two flaps is a direct longitudinal pull on the hemmed edge of the projection, which is of course capable of withstanding great strain. Of course it will be understood that where this stay is applied to the flaps of shirts there is only one projection $a^3$ at each side of the shirt. Usually the back is provided with the projection at one side of the shirt and the front has the projection at the opposite side of the shirt.

In making thousands of shirts the cost of making and putting in the gussets between the flaps of the shirt becomes a large item. As usually made these strengthening-gussets consist of a peculiar triangular piece inserted in the corners between the flaps and sewed therein in a peculiar manner which is difficult and, in fact, seldom properly done. These pieces are inserted after the fronts and backs have been sewed together, thereby requiring an entirely distinct and separate operation by an operator skilled in making and inserting the gussets. Also, the gussets often pull out and break away from the stitching when the garment is in use because of the sometimes necessarily imperfect manner in which the gussets are inserted.

The improved stay or gusset here shown is formed integral with the body of the garment. There are no separate pieces. When the flap is hemmed, the lower edge of the projection is also hemmed, and when the pieces of the garment are sewed together the projection is also sewed to the opposite piece. Hence no separate operations or pieces are required in making the improved stay and the labor, time, and expense of making and inserting the ordinary gusset are entirely avoided, and yet a stay of great strength and durability is provided which is of general application wherever meeting edges or splits are located in garments or other articles. This improved gusset puckers out between the flaps, forming a fullness and giving greater spread to the garment at that point and decreasing the necessary length of the split between the flaps.

It is evident that various changes might be made in the forms, constructions, and arrangements of the parts described without departing from the spirit and scope of my invention. Hence I do not wish to limit myself to the constructions as set forth.

Having thus fully described my invention, what I claim as new, and desire to secure by Letters Patent of the United States, is—

1. A shirt having the front and back portions meeting and united over the outer portions of the shoulders and overlapping and secured to the sleeves outwardly beyond the stitching securing the sleeve to the body around the armhole, and yokes uniting the front and back portions between the neck and said meeting edges, substantially as described.

2. A shirt having the front and back portions meeting and secured together over the outer portions of the shoulders and extending outwardly and overlapping and secured to the sleeves outwardly beyond the stitching around the armholes, and the yokes tapering from the neck outwardly to a point and uniting the edges of the back and front portions from the neck outwardly to said meeting edges, substantially as described.

3. A shirt having the front and back portions, the outwardly-tapered inner shoulder-yokes uniting their top edges, the said back and front top edges meeting and united beyond the outer ends of said yokes and extended outwardly and overlapping the sleeves and united thereto, outwardly beyond the stitching around the sleeves and uniting the same to the body, and the outer shoulder-yokes extending from the sleeves to the neck and covering the inner yokes and extending beyond the united edges of the inner yokes and back and front, and onto and united to the back and front, substantially as described.

4. A garment having front and back body portions, yokes uniting the top edges of said front and back portions and tapering outwardly from the neck-opening toward the armholes, the top edges of the front and back body portions meeting and secured directly together beyond the outer ends of said yokes, substantially as described.

5. A garment having the front and back body portions, tapered inner yokes uniting the top edges of said body portions by lines of stitching, such as 8, and the outer shoulder-yokes arranged above and covering said inner yokes and extended down at the back and front beyond the inner yokes and united to the back and front body portions by lines of stitching, such as 12, arranged downwardly beyond the lines of stitching 8, for the purpose substantially as described.

6. A garment having its body portion provided with two projections or ears at each armhole, said projections integral with the body, the projections at each armhole stitched together, and the sleeves stitched to the body completely around the armholes and inwardly beyond said projections with the projections extending outwardly along the sleeves over the shoulders and stitched around their edges to the sleeves outside of said stitching around the armholes, substantially as described.

7. A garment having its body portion formed with the armholes, the sleeves having their inner ends stitched to the body portion completely around the armholes, said body portion cut with an ear or projection integral therewith and projecting outwardly above each armhole, respectively, and beyond said stitching around the same and within the sleeves, and stitched around their edges to the sleeves, so that each sleeve is united to the body portion around the armhole and at another point outwardly beyond the armhole, and the body portion extends outwardly along the shoulder portion of each sleeve, substantially as described.

8. A garment having the gusset at the end of the seam uniting two portions thereof, comprising a tapered projection extending out from the edge of one portion, said seam continued along one edge of said projection and uniting the same to the edge of the opposite portion, the projection puckering out between said portions forming a fullness, the other edge of the projection being hemmed in continuation of the hemmed edges of said portions below said seam, substantially as described.

In testimony whereof I affix my signature in presence of two witnesses.

GEORGE F. POOLEY.

Witnesses:
  A. L. STEWART,
  WM. B. HYSAN, Jr.